(12) United States Patent
Wang et al.

(10) Patent No.: US 11,383,856 B2
(45) Date of Patent: Jul. 12, 2022

(54) LAMPSHADE STRUCTURES, UNMANNED AERIAL VEHICLE ARMS, UNMANNED AERIAL VEHICLES, AND MOVABLE PLATFORMS

(71) Applicant: SZ DJI TECHNOLOGY CO., LTD., Shenzhen (CN)

(72) Inventors: Chaorui Wang, Shenzhen (CN); Li Qiu, Shenzhen (CN); Xuegui Feng, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 17/121,737

(22) Filed: Dec. 14, 2020

(65) Prior Publication Data

US 2021/0094702 A1 Apr. 1, 2021

Related U.S. Application Data

(63) Continuation of application No. PCT/CN2018/119237, filed on Dec. 4, 2018.

(51) Int. Cl.
*B64D 47/02* (2006.01)
*B60Q 1/02* (2006.01)
(Continued)

(52) U.S. Cl.
CPC .............. *B64D 47/02* (2013.01); *B60Q 1/02* (2013.01); *B63B 45/02* (2013.01); *B64C 39/024* (2013.01);
(Continued)

(58) Field of Classification Search
CPC .. F21V 3/049; F21V 5/08; F21V 5/045; F21S 43/26
See application file for complete search history.

(56) References Cited

U.S. PATENT DOCUMENTS 4,371,916 A * 2/1983 De Martino ............ F21S 43/26
362/511
4,929,866 A * 5/1990 Murata ................ G02B 6/0073
313/500
(Continued)

FOREIGN PATENT DOCUMENTS

CN 101206013 A 6/2008
CN 201688165 U 12/2010
(Continued)

OTHER PUBLICATIONS

International Search Report of PCT/CN2018/119237 (dated Mar. 28, 2019).

*Primary Examiner* — Alexander K Garlen
(74) *Attorney, Agent, or Firm* — Fideli Law PLLC

(57) ABSTRACT

The present disclosure provides a lampshade structure, an unmanned aerial vehicle (UAV) arm, a UAV, and a movable platform. The lampshade structure may comprise a first light-transmitting surface of a lampshade body close to a light-emitting element and a second light-transmitting surface of the lampshade body away from the light-emitting element; wherein the first light-transmitting surface may include a scattering structure to outwardly refract light emitted by the light-emitting element to expand a light-emitting angle and an irradiation direction of the light-emitting element, thereby obtaining sufficient light in a desired direction.

19 Claims, 6 Drawing Sheets

(51) Int. Cl.

| | | |
|---|---|---|
| *B63B 45/02* | (2006.01) | |
| *F21V 3/04* | (2018.01) | |
| *F21S 43/20* | (2018.01) | |
| *B64C 39/02* | (2006.01) | |
| *F21V 5/00* | (2018.01) | |
| *F21V 5/04* | (2006.01) | |
| *F21W 107/30* | (2018.01) | |
| *B63B 35/00* | (2020.01) | |
| *F21Y 115/10* | (2016.01) | |

(52) U.S. Cl.
CPC .............. *F21S 43/26* (2018.01); *F21V 3/049* (2013.01); *F21V 5/00* (2013.01); *F21V 5/045* (2013.01); *B63B 2035/006* (2013.01); *B64C 2201/12* (2013.01); *F21W 2107/30* (2018.01); *F21Y 2115/10* (2016.08)

(56) References Cited

U.S. PATENT DOCUMENTS

| | | | | |
|---|---|---|---|---|
| 5,897,196 A * | 4/1999 | Soskind | ................ | F21S 41/334 |
| | | | | 362/507 |
| 7,040,786 B2 | 5/2006 | Ganzer et al. | | |
| 7,794,118 B2 * | 9/2010 | Huang | ...................... | F21V 5/04 |
| | | | | 362/336 |
| 7,800,840 B2 * | 9/2010 | Shyu | .................. | G02B 19/0061 |
| | | | | 359/742 |
| 7,815,345 B2 * | 10/2010 | Misawa | ................ | F21V 7/0091 |
| | | | | 362/327 |
| 8,662,721 B2 * | 3/2014 | Calvin | ................... | B64D 47/06 |
| | | | | 362/470 |
| 9,335,024 B2 * | 5/2016 | Wang He | ................ | F21V 5/045 |
| 9,677,738 B2 * | 6/2017 | Sun | ....................... | F21V 29/773 |
| 9,840,820 B2 * | 12/2017 | Taylor | ..................... | B63B 45/04 |
| 10,132,476 B2 * | 11/2018 | Meir | ...................... | G02B 27/30 |
| 10,709,071 B2 * | 7/2020 | Yahya | ...................... | H01L 33/58 |
| 2004/0004836 A1 * | 1/2004 | Dubuc | ...................... | F21K 9/60 |
| | | | | 362/249.01 |
| 2005/0190564 A1 * | 9/2005 | Amano | .................. | F21V 5/045 |
| | | | | 362/336 |
| 2010/0061106 A1 * | 3/2010 | Shyu | .................. | G02B 19/0009 |
| | | | | 362/311.02 |
| 2014/0334175 A1 | 11/2014 | Jha et al. | | |
| 2015/0217840 A1 * | 8/2015 | Taylor | ..................... | B63B 45/04 |
| | | | | 114/219 |
| 2016/0161084 A1 * | 6/2016 | Cho | ........................ | F21V 5/045 |
| | | | | 362/235 |
| 2017/0092083 A1 * | 3/2017 | Lin | ...................... | G02B 19/0014 |
| 2018/0345846 A1 * | 12/2018 | Alisafaee | .............. | F21S 43/249 |

FOREIGN PATENT DOCUMENTS

| | | |
|---|---|---|
| CN | 201954462 U | 8/2011 |
| CN | 202216023 U | 5/2012 |
| CN | 104488017 A | 4/2015 |
| CN | 205524926 U | 8/2016 |
| CN | 205535348 U | 8/2016 |
| CN | 107776867 A | 3/2018 |
| CN | 207389548 U | 5/2018 |
| CN | 207529081 U | 6/2018 |
| WO | 2018058297 A1 | 4/2018 |

\* cited by examiner

LAMPSHADE STRUCTURES, UNMANNED AERIAL VEHICLE ARMS, UNMANNED AERIAL VEHICLES, AND MOVABLE PLATFORMS

RELATED APPLICATIONS

The present patent document is a continuation of PCT Application Serial No. PCT/CN2018/119237, filed on Dec. 4, 2018, designating the United States and published in Chinese, which is hereby incorporated by reference.

TECHNICAL FIELD

The present disclosure relates to the technical field of unmanned aerial vehicles (UAVs), and in particular, to a lampshade structure, a UAV arm, a UAV, and a movable platform.

BACKGROUND

An indicator lamp on a conventional UAV arm has a relatively small light-emitting angle, and an irradiation direction cannot be effectively controlled. Therefore, sufficient light may not be available in a desired direction. A conventional lampshade merely plays a role in structure protection, but cannot meet a desired optical requirement.

BRIEF SUMMARY

The present disclosure provides a lampshade structure, a UAV arm, a UAV, and a movable platform.

Specifically, the present disclosure is achieved through the following technical solutions:

In accordance with a first aspect of the present disclosure, there is provided a lampshade structure, which comprises a first light-transmitting surface of a lampshade body which may be close to a light-emitting element and include a scattering structure to outwardly refract light emitted by the light-emitting element and a second light-transmitting surface of the lampshade body away from the light-emitting element.

In accordance with a second aspect of the present disclosure, there is provided an unmanned aerial vehicle (UAV) arm, which comprises an arm motor, a light-emitting element arranged inside the arm motor, and a lampshade structure arranged at an end portion of the arm motor includes a lampshade body.

The lampshade structure includes a lampshade body, the lampshade body includes a first light-transmitting surface which may be close to the light-emitting element and include a scattering structure to outwardly refract light emitted by the light-emitting element; and a second light-transmitting surface away from the light-emitting element.

In accordance with a third aspect of the present disclosure, there is provided an unmanned aerial vehicle (UAV), which comprises an arm, an arm motor, a light-emitting element being arranged inside the arm motor, and a lampshade structure arranged at an end portion of the arm motor.

The lampshade structure includes a lampshade body, the lampshade body includes a first light-transmitting surface which may be close to the light-emitting element and include a scattering structure to outwardly refract light emitted by the light-emitting element, and a second light-transmitting surface away from the light-emitting element.

In accordance with a forth aspect of the present disclosure, there is provided a movable platform, which comprises a carrier, a power unit providing power for the movable platform, a light-emitting element arranged on the carrier, and a lampshade structure being arranged at an end portion of the carrier.

The lampshade structure includes a lampshade body, the lampshade body includes a first light-transmitting surface which may be close to the light-emitting element and include a scattering structure to outwardly refract light emitted by the light-emitting element, and a second light-transmitting surface away from the light-emitting element.

As can be learned from the technical solution above, in some embodiments of the present disclosure, the light emitted by the light-emitting element is refracted outwardly by the scattering structure arranged on the lampshade body, to expand a light-emitting angle and an irradiation direction of the light-emitting element, thereby obtaining sufficient light in a desired direction.

BRIEF DESCRIPTION OF THE DRAWINGS

In order to describe the technical solutions in the embodiments of the present disclosure more clearly, the accompanying drawings required to describe the embodiments are briefly described below. Apparently, the accompanying drawings described below are only some embodiments of the present disclosure. Those of ordinary skill in the art may further obtain other accompanying drawings based on these accompanying drawings without inventive effort.

DETAILED DESCRIPTION

The following clearly and completely describes the technical solutions in the embodiments of the present disclosure with reference to accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Figure 1:
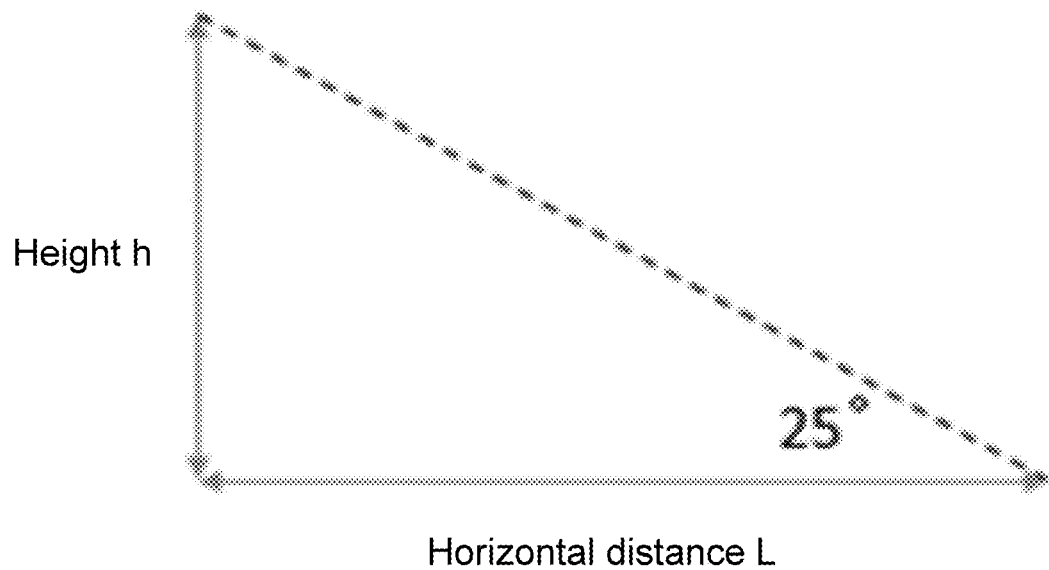
FIG. 1 is a schematic view of application of an existing lampshade structure.

Light emitted by an LED indicator lamp may generally cover a whole hemispherical space. The light may have the maximum intensity in the normal direction, and gradually become weaker as it deviates from the normal direction. Therefore, the light intensity right below the indicator lamp, which is 0.9 cd, may be generally about 10% that of the normal direction. As shown in FIG. 1, using a UAV as an example, if a height h of the UAV is 100 m and a maximum light-emitting angle of a conventional lampshade design in a vertical direction is −25°, in order to allow an observer to see high-intensity light, a horizontal distance L from the UAV to the observer is required to be greater than 214 m. As a result, the effect of the indicator lamp is greatly restricted.

The following describes a lampshade structure, a UAV arm, a UAV, and a movable platform of the present disclosure in detail with reference to the accompanying drawings. If there is no conflict, the following embodiments and features in implementations may be mutually combined.

As shown in FIG. 2 to FIG. 6, an embodiment of the present disclosure provides a lampshade structure 100, comprising: a lampshade body 10. The lampshade body 10 may include a first light-transmitting surface 11 close to a light-emitting element 90 and a second light-transmitting surface 12 away from the light-emitting element 90. The first light-transmitting surface 11 may include a scattering structure 20 for outwardly refracting light emitted by the light-emitting element 90. The scattering structure 20 may include a first scattering surface 21 for outwardly refracting the light emitted by the light-emitting element 90. In this embodiment, the scattering structure 20 may be used for downwardly refracting the light emitted by the light-emitting element 90. In this case, the light emitted by the light-emitting element 90 may be refracted by the scattering structure 20 after passing through the first light-transmitting surface 11, and may be then sent out from the second light-transmitting surface 12. A refraction direction of the light may be shown by the dashed line in FIG. 3 to expand a light-emitting angle of the light along a vertical direction. For example, the lampshade body 10 may be made of optical plastic and may have a light transmittance of 97% or higher. The light-emitting element 90 may be an LED lamp or an indicator lamp of other types. Certainly, in other examples, the scattering structure 20 may alternatively be used for refracting the light emitted by the light-emitting element 90 towards two sides thereof along a horizontal plane, or refracting the light emitted by the light-emitting element 90 upwardly along an upper portion of the lampshade body 10 (e.g., refracting the light emitted by the light-emitting element 90 upwardly along a vertical plane), which may not be limited in the present disclosure.

As can be learned from the technical solution above, in the embodiment of the present disclosure, the light emitted by the light-emitting element 90 may be refracted outwardly by the scattering structure 20 arranged on the lampshade body 10, to expand a light-emitting angle and an irradiation direction of the light-emitting element 90, thereby obtaining sufficient light in a desired direction.

According to some exemplary implementations, the scattering structure 20 may include at least one first scattering surface 21 for downwardly refracting light emitted by the light-emitting element 90. In the example shown in the figure, the first scattering surface 21 may be a plane, and there may be one first scattering surface 21. The first scattering surface 21 may be arranged obliquely relative to a vertical surface. The first scattering surface 21 may include an upper edge portion 211 and a lower edge portion 212. The upper edge portion 211 may be away from the light-emitting element 90, and the lower edge portion 212 may be close to the light-emitting element 90. For example, an oblique angle α between the first scattering surface 21 and the vertical surface may be 20° to 25°. In this embodiment, the oblique angle α between the first scattering surface 21 and the vertical surface may be 22.5°. Certainly, in other examples, there may be multiple first scattering surfaces 21 that are arranged obliquely relative to each other, or the first scattering surface 21 may be a spherical surface or a hemispherical surface. In both cases, the light emitted by the light-emitting element 90 can be refracted at different refraction angles, to expand the light-emitting angle and the irradiation direction of the light-emitting element 90.

According to some exemplary implementations, the lampshade body 10 may include a second scattering surface 131 to outwardly refract light refracted by the scattering structure 20. In this embodiment, the second scattering surface 131 may be used for downwardly refracting, along the vertical direction, the light emitted by the light-emitting element 90, where a refraction direction of the light may be shown by the dashed line in FIG. 3, so that in the vertical direction, the light-emitting element 90 can achieve a maximum light-emitting angle of −90° and a light intensity of 1.3 cd. For example, the second scattering surface 131 may be a step-like structure, so that light refracted by the first scattering surface 21 of the scattering structure 20 can obtain more refraction angles and directions, thereby further expanding the light-emitting angle and the irradiation direction of the light-emitting element 90, to obtain sufficient light in the desired direction. Certainly, in other examples, the second scattering surface 131 may alternatively be a spherical surface or a hemispherical surface, and in this case, light refracted by the first scattering surface 21 of the scattering structure 20 can also obtain more refraction angles and directions, thereby expanding the light-emitting angle and the irradiation direction of the light-emitting element 90.

Figure 2:
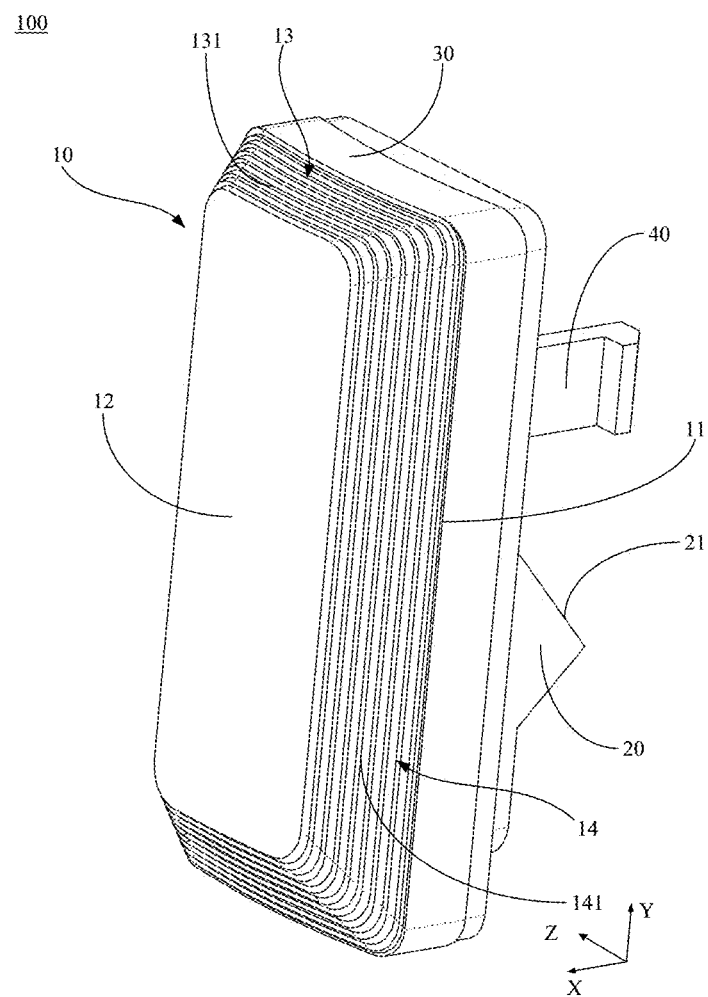
FIG. 2 is a three-dimensional schematic view of a lampshade structure according to some exemplary embodiments of the present disclosure.
Figure 3:
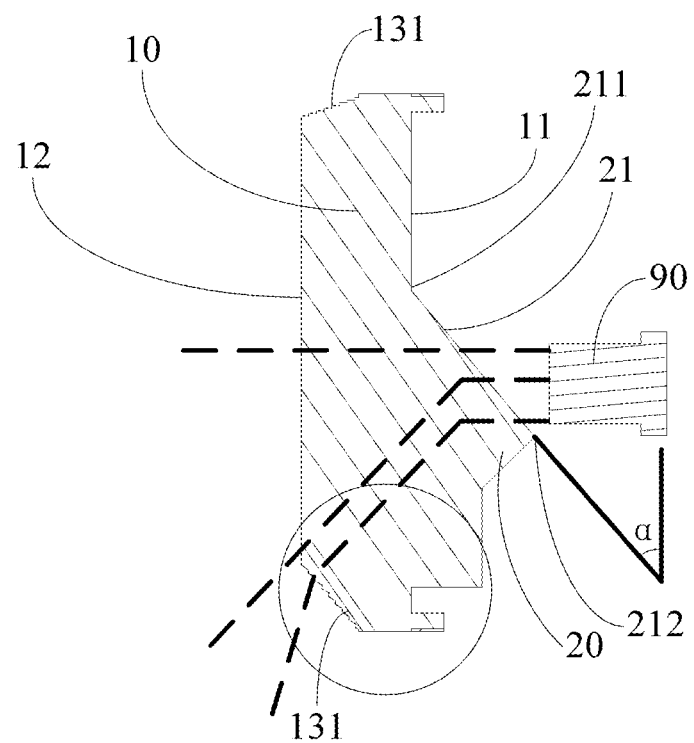
FIG. 3 is a side view of a lampshade structure according to some exemplary embodiments of the present disclosure.

According to some exemplary implementations, the lampshade body 10 may be a quadrangular frustum structure, e.g., a truncated pyramid with a rectangular base, and an area of the first light-transmitting surface 11 may be larger than an area of the second light-transmitting surface 12. In this embodiment, the quadrangular frustum structure may include two first sides 13 on the upper and lower slopes of the lampshade body 10 as shown in FIG. 2, that is, the two first sides 13 located on two sides of the lampshade body 10 along the vertical direction (as shown by direction Y in FIG. 2) and two second sides 14 on the left and right slopes of the lampshade body 10, that is, two second sides 14 located on two sides of the lampshade body 10 along the horizontal direction (as shown by direction Z in FIG. 2). As shown in FIG. 2, the two first sides 13 of the lampshade body adjoin to the two second sides 14. The second scattering surface 131 may be arranged on the first side 13 at the bottom of the lampshade body 10. Certainly, in other embodiments, the first side 13 at the top of the lampshade body 10 may also include the second scattering surface 131, to expand the light-emitting angle and the irradiation direction of the light-emitting element 90. In addition, the lampshade body 10 may be other structures, for example, a truncated pyramid structure with a circular base or a truncated pyramid structure with a triangular base, provided that the light-emitting angle and the irradiation direction of the light-emitting element 90 along the vertical direction and the horizontal direction can be expanded. This is not limited in the present disclosure.

When there are multiple first scattering surfaces 21, the first side 13 are arranged corresponding to the first scattering surfaces 21, so that light refracted by the first scattering surfaces 21 may be scattered by the first side 13 to a desired direction.

According to some exemplary implementations, the two second sides 14 may each include a third scattering surface 141 for outwardly refracting the light refracted by the first scattering surface 21 of the scattering structure 20. In this embodiment, the third scattering surface 141 may be a step-like structure, so that the light refracted by the first scattering surface 21 of the scattering structure 20 can obtain more refraction angles and directions, thereby further expanding the light-emitting angle and the irradiation direction of the light-emitting element 90, to obtain sufficient light in the desired direction. It may be appreciated that, the third scattering surface 141 may be used for outwardly refracting, along the horizontal direction, the light refracted by the first scattering surface 21 of the scattering structure 20, where a refraction direction of the light is shown by the dashed line in FIG. 5, so that a maximum light-emitting angle of the light-emitting element 90 along the horizontal direction can reach ±60°, that is, a full range in the horizontal direction can reach 120°. In this way, the light-emitting angle and the irradiation direction of the light-emitting element 90 along the horizontal direction can be further expanded, to obtain sufficient light in the desired direction. Certainly, in other examples, the third scattering surface 141 may alternatively be a spherical surface or a hemispherical surface, and in this case, the light refracted by the first scattering surface 21 of the scattering structure 20 can also obtain more refraction angles and directions, thereby expanding the light-emitting angle and the irradiation direction of the light-emitting element 90.

According to some exemplary implementations, in the example shown in the figure, the step-like structures of the second scattering surface 131 and the third scattering surface 141 may each include lateral step surfaces and longitudinal step surfaces. The lateral step surfaces and the longitudinal step surfaces of the second scattering surface 131 may be all arranged slightly obliquely relative to a horizontal plane, to change the light-emitting angle of the light-emitting element 90. The lateral step surfaces of the third scattering surface 141 may be arranged along the horizontal direction, and the longitudinal step surfaces thereof may be arranged along the vertical direction, so that the light-emitting angle of the light-emitting element 90 can also be changed. In other examples, the lateral step surfaces and the longitudinal step surfaces of the third scattering surface 141 may also be arranged slightly obliquely relative to the horizontal plane. The lateral step surfaces of the second scattering surface 131 may also be arranged along the horizontal direction, and the longitudinal step surfaces thereof may also be arranged along the vertical direction. This may be set according to actual requirements, which is not limited in the present disclosure.

Figure 4:
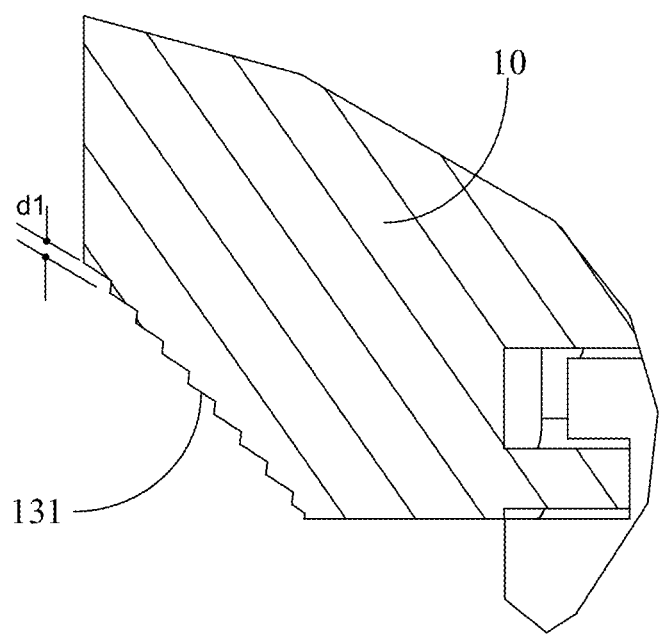
FIG. 4 is a schematic enlarged view of A in FIG. 3.
Figure 5:
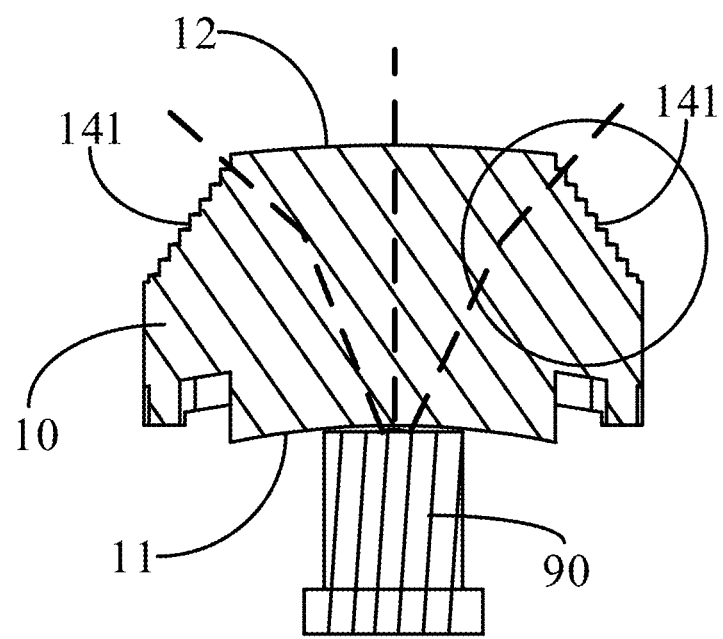
FIG. 5 is a top view of a lampshade structure according to some exemplary embodiments of the present disclosure.
Figure 6:
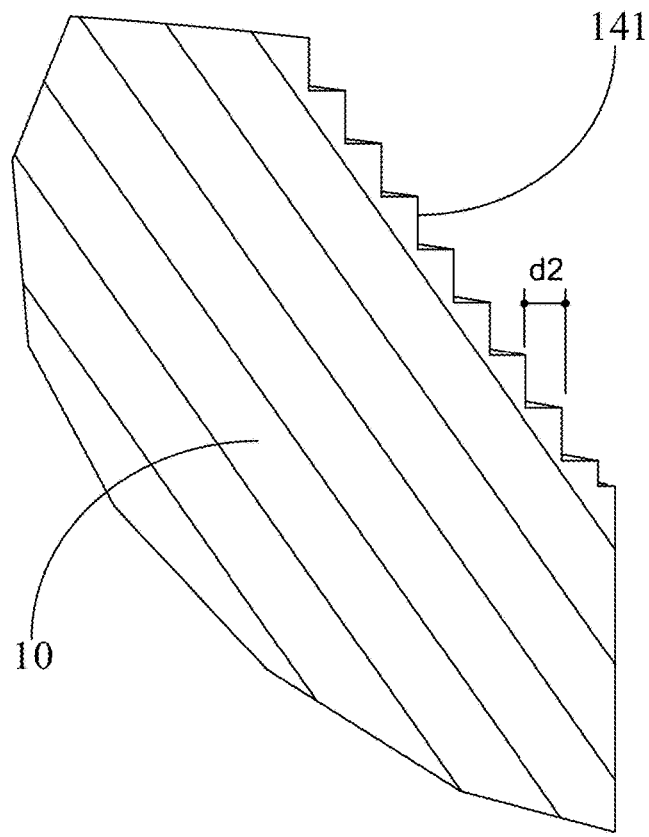
FIG. 6 is a schematic enlarged view of B in FIG. 5.

In the example shown in the figure, the step surfaces of the step-like structure of the second scattering surface 131 and the third scattering surface 141 may be equidistant, and the distances in the two structures may be equal to each other. Specifically, the distance between any two adjacent step surfaces of the step-like structure of the second scattering surface 131 is d1, as shown in FIG. 4; the distance between any two adjacent step surfaces of the step-like structure of the third scattering surface 141 is d2, as shown in FIG. 6, and d1 may be equal to d2. In other examples, the step surfaces of the step-like structure of the second scattering surface 131 and the step-like structure of the third scattering surface 141 may be unevenly distributed, and the distances between any two adjacent step surfaces in the two structures may be set to different values. This may be set according to actual requirements, and is not limited in the present disclosure.

In addition, the step surfaces of the step-like structures of the two second scattering surfaces 131 may be arranged at different oblique angles relative to the horizontal direction. Likewise, the step surfaces of the step-like structures of the two third scattering surfaces 141 may be arranged at different oblique angles relative to the horizontal direction. This may be set according to actual requirements, and is not limited in the present disclosure.

According to some exemplary implementations, the lampshade structure 100 in this embodiment of the present disclosure may further include a reinforcing cover 30 arranged on the first light-transmitting surface 11, and the scattering structure 20 may be arranged on the reinforcing cover 30. The reinforcing cover 30 may reinforce the overall structural strength of the lampshade structure 100. It may be appreciated that, the light emitted by the light-emitting element 90 may enter the first light-transmitting surface 11 after passing through a side surface, which may be close to the light-emitting element 90, of the reinforcing cover 30, and then may be refracted by the first scattering surface 21 and sent out from the second light-transmitting surface 12. In this embodiment, the reinforcing cover 30 may be made of the same optical plastic as the lampshade body 10, to ensure the stability of light refraction.

According to some exemplary implementations, the lampshade structure 100 in this embodiment of the present disclosure may further include a connecting member 40 connected to an external structural member, the connecting member 40 being arranged on the first light-transmitting surface 11. In this embodiment, the connecting member 40 may use a buckle structure. In other examples, the connecting member 40 may be a structural member of other forms, for example, a plug connector, etc.

Figure 7:
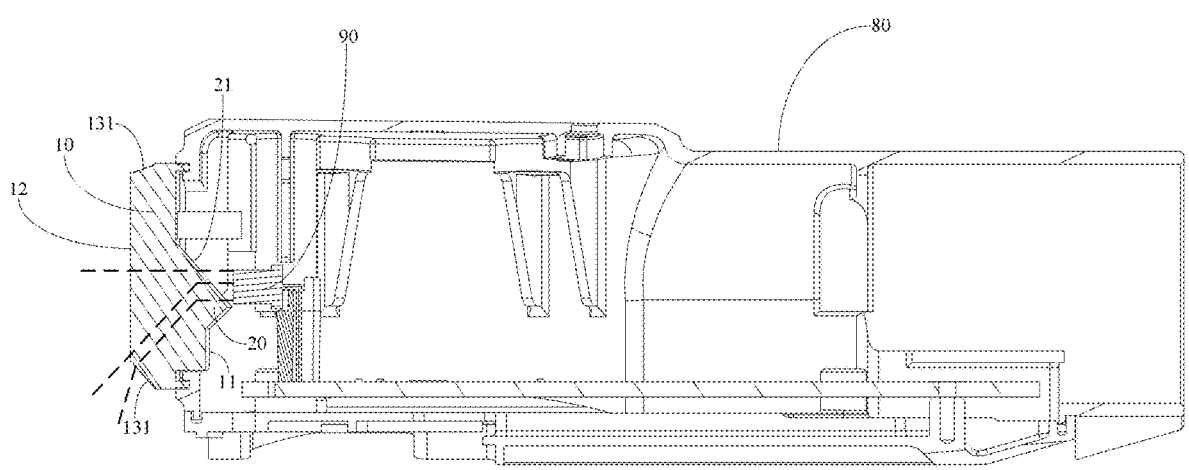
FIG. 7 and FIG. 8 are schematic views illustrating a structure in which a lampshade structure is applied to a UAV arm according to some exemplary embodiments of the present disclosure.
Figure 8:
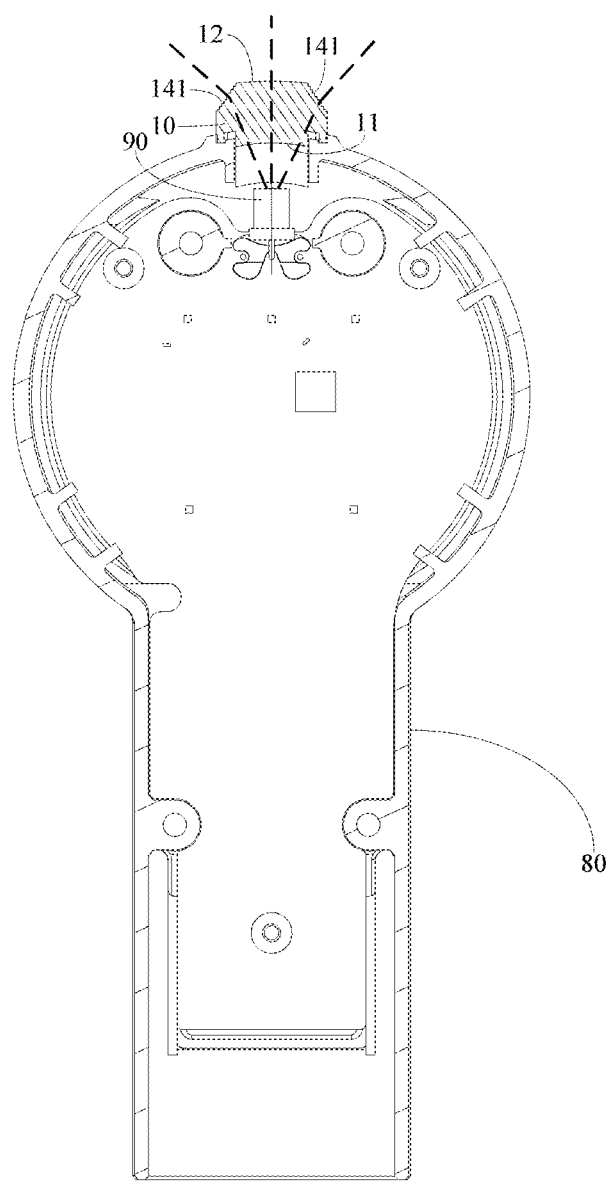

As shown in FIG. 7 and FIG. 8, an embodiment of the present disclosure may further provide a UAV arm, which may include an arm motor 80, a light-emitting element 90, and a lampshade structure 100. The light-emitting element 90 may be arranged inside the arm motor 80, and the lampshade structure 100 may be arranged at an end portion of the arm motor 80. It should be noted that, the description about the lampshade structure 100 in the foregoing embodiments and implementations may be also applicable to the UAV arm of the present disclosure. In this embodiment, the light-emitting element 90 may be an LED lamp or an indicator lamp of other types.

As can be learned from the technical solution above, in the embodiment of the present disclosure, light emitted by the light-emitting element 90 may be refracted outwards by the scattering structure 20 arranged on the lampshade body 10 of the lampshade structure 100, to expand a light-emitting angle and an irradiation direction of the light-emitting element 90, so that sufficient light may be obtained in a desired direction. A height required to allow an observer under a UAV to clearly see light of the indicator lamp may be reduced, so that the UAV can be accurately seen by the observer underneath, thus improving the effect of the indicator lamp.

An embodiment of the present disclosure may further provide a UAV, including an arm, an arm motor 80, a light-emitting element 90, and a lampshade structure 100. The arm motor 80 may be arranged on the arm, the light-emitting element 90 may be arranged inside the arm motor 80, and the lampshade structure 100 may be arranged at an end portion of the arm motor 80. It should be noted that, the description about the lampshade structure 100 in the foregoing embodiments and implementations may be also applicable to the UAV of the present disclosure. In this embodiment, the light-emitting element 90 may be an LED lamp or an indicator lamp of other types.

As can be learned from the technical solution above, in the embodiment of the present disclosure, light emitted by the light-emitting element 90 may be refracted outwards by the scattering structure 20 arranged on the lampshade body 10 of the lampshade structure 100, to expand a light-emitting angle and an irradiation direction of the light-emitting element 90, so that sufficient light may be obtained in a desired direction. A height required to allow an observer under a UAV to clearly see light of the indicator lamp may be reduced, so that the UAV can be accurately seen by the observer underneath, thus improving the effect of the indicator lamp.

An embodiment of the present disclosure may further provide a movable platform, including a carrier, a power unit, a light-emitting element, and a lampshade structure. The light-emitting element may be arranged on the carrier, and the lampshade structure may be arranged at an end portion of the carrier; the power unit may provide power for the movable platform. It can be appreciated that the carrier may be any component to support the framework of a movable platform. For example, the carrier may be the arm of the UAV in the foregoing embodiments and implementations as shown in FIG. 7. One of ordinary skill in the art would also understand at the time of filing of this disclosure that the carrier may also be a trestle, a bracket, a balloon, or a cage, etc. It should be noted that, the description about the lampshade structure 100 in the foregoing embodiments and implementations may be also applicable to the movable platform of the present disclosure. In this embodiment, the light-emitting element 90 may be an LED lamp or an indicator lamp of other types. Embodiments of the present disclosure may provide a method for evaluating image feature points and a movable platform. The movable platform may be, for example, a UAV, an unmanned ship, an unmanned vehicle, or a robot, etc. The UAV may be, for example, a rotorcraft, such as a rotorcraft driven by multiple thrust units through air, and the embodiment of the present disclosure is not limited thereto.

As can be learned from the technical solution above, in the embodiment of the present disclosure, light emitted by the light-emitting element 90 may be refracted outwards by the scattering structure 20 arranged on the lampshade body 10 of the lampshade structure 100, to expand a light-emitting angle and an irradiation direction of the light-emitting element 90, so that sufficient light may be obtained in a desired direction, thereby improving the effect of the indicator lamp.

It should be noted that, in this specification, relationship terms such as first and second are only used to distinguish an entity or operation from another entity or operation, but do not necessarily require or imply that there is any actual relationship or order between these entities or operations. In addition, terms "include", "comprise", or any other variations thereof are intended to cover non-exclusive inclusion, so that a process, a method, an article, or a device including a series of elements not only includes those elements, but also includes other elements that are not explicitly listed, or also includes elements inherent to the process, the method, the article, or the device. Without more restrictions, the elements defined by the phrase "including a . . . " do not exclude the existence of other identical elements in the process, method, article, or device including the elements.

The gimbal handle and the gimbal having the same provided in the embodiments of the present disclosure are described in detail above. Specific embodiments are used in this specification for illustration of the principles and implementation methods of the present disclosure. The description of these embodiments is merely used to help illustrate the method and its core concept of the present disclosure. Those of ordinary skill in the art may make modifications to the specific implementation methods and application scope according to the concept of the present disclosure. In conclusion, the content of the specification should not be construed as a limitation on the present disclosure.

The invention claimed is:

1. A lampshade structure, comprising:
   a first light-transmitting surface of a lampshade body close to a light-emitting element, including a scattering structure to outwardly refract light emitted by the light-emitting element at least partially towards a second scattering surface of the lampshade body;
   a second light-transmitting surface of the lampshade body away from the light-emitting element,
   wherein the second scattering surface outwardly refracts the light refracted by the scattering structure, and
   wherein the scattering structure includes at least one first scattering surface being arranged obliquely relative to at least a portion of the first light-transmitting surface, and the second scattering surface is arranged obliquely relative to the second light-transmitting surface.

2. The lampshade structure according to claim 1, wherein the at least one first scattering surface downwardly refracts the light emitted by the light-emitting element.

3. The lampshade structure according to claim 2, wherein the at least one first scattering surface is a plane and arranged obliquely relative to a vertical surface and including an upper edge portion and a lower edge portion,
   the upper edge portion is away from the light-emitting element, and
   the lower edge portion is close to the light-emitting element.

4. The lampshade structure according to claim 3, wherein an oblique angle between the at least one first scattering surface and the vertical surface is 20° to 25°.

5. The lampshade structure according to claim 3, wherein the at least one first scattering surface includes a plurality of first scattering surfaces arranged obliquely relative to each other.

6. The lampshade structure according to claim 2, wherein the at least one first scattering surface is spherical or hemispherical.

7. The lampshade structure according to claim 1, wherein the second scattering surface is a step-like structure.

8. The lampshade structure according to claim 1, wherein the lampshade body is a quadrangular frustum structure, where an area of the first light-transmitting surface is greater than an area of the second light-transmitting surface;
   the quadrangular frustum structure includes two first sides of the lampshade body and two second sides of the lampshade body adjoining to the two first sides; and
   the second scattering surface is arranged on the first side located at a bottom of the lampshade body.

9. The lampshade structure according to claim 8, wherein the second side includes a third scattering surface to outwardly refract the light refracted by the scattering structure.

10. The lampshade structure according to claim 9, wherein the third scattering surface is a step-like structure.

11. The lampshade structure according to claim 1, further comprising a reinforcing cover arranged on the first light-transmitting surface,
    wherein the scattering structure is arranged on the reinforcing cover.

12. The lampshade structure according to claim 1, further comprising a connecting member connected to an external structural member, the connecting member being arranged on the first light-transmitting surface.

13. An arm mounted on a movable platform, comprising:
an arm motor;
a light-emitting element being arranged inside the arm motor; and
a lampshade structure being arranged at an end portion of the arm motor and including a lampshade body,
wherein the lampshade body includes:
- a first light-transmitting surface close to the light-emitting element, including a scattering structure to outwardly refract light emitted by the light-emitting element at least partially towards a second scattering surface of the lampshade body,
- a second light-transmitting surface away from the light-emitting element,
- wherein the second scattering surface outwardly refracts the light refracted by the scattering structure, and
- wherein the scattering structure includes at least one first scattering surface being arranged obliquely relative to at least a portion of the first light-transmitting surface, and the second scattering surface is arranged obliquely relative to the second light-transmitting surface.

14. The arm mounted on the movable platform according to claim 13, wherein the scattering structure includes at least one first scattering surface to downwardly refract the light emitted by the light-emitting element;
the at least one first scattering surface is a plane arranged obliquely relative to a vertical surface, including an upper edge portion and a lower edge portion,
the upper edge portion is away from the light-emitting element, and the lower edge portion is close to the light-emitting element.

15. The arm mounted on the movable platform according to claim 13, wherein the second scattering surface is a step-like structure.

16. A movable platform, comprising:
a carrier;
a power unit providing power for the movable platform;
a light-emitting element arranged on the carrier; and
a lampshade structure being arranged at an end portion of the carrier and including a lampshade body,
wherein the lampshade body includes:
- a first light-transmitting surface close to the light-emitting element and including a scattering structure to outwardly refract light emitted by the light-emitting element at least partially towards a second scattering surface of the lampshade body,
- a second light-transmitting surface away from the light-emitting element,
- wherein the second scattering surface outwardly refracts the light refracted by the scattering structure, and
wherein the scattering structure includes at least one first scattering surface being arranged obliquely relative to at least a portion of the first light-transmitting surface, and the second scattering surface is arranged obliquely relative to the second light-transmitting surface.

17. The movable platform according to claim 16, wherein the scattering structure includes at least one first scattering surface to downwardly refract the light emitted by the light-emitting element;
the at least one first scattering surface is a plane arranged obliquely relative to a vertical surface, including an upper edge portion away from the light-emitting element and a lower edge portion close to the light-emitting element.

18. The movable platform according to claim 16, wherein the second scattering surface is a step-like structure.

19. The movable platform according to claim 16, wherein the movable platform includes at least one of an unmanned aerial vehicle, an unmanned ship, an unmanned vehicle, or a robot.

* * * * *